(12) United States Patent
Huang et al.

(10) Patent No.: US 11,898,032 B2
(45) Date of Patent: Feb. 13, 2024

(54) BIODEGRADABLE COMPOSITION

(71) Applicant: Chien-Chung Huang, Taichung (CN)

(72) Inventors: Chien-Chung Huang, Taichung (CN); Yeng-Fong Shih, Taichung (CN)

(73) Assignee: Chien-Chung Huang, Taichung (TW)

( * ) Notice: Subject to any disclaimer, the term of this patent is extended or adjusted under 35 U.S.C. 154(b) by 531 days.

(21) Appl. No.: 17/250,790

(22) PCT Filed: Sep. 7, 2018

(86) PCT No.: PCT/CN2018/104499
§ 371 (c)(1),
(2) Date: Mar. 4, 2021

(87) PCT Pub. No.: WO2020/047816
PCT Pub. Date: Mar. 12, 2020

(65) Prior Publication Data
US 2021/0347985 A1    Nov. 11, 2021

(51) Int. Cl.
*C08L 67/04*    (2006.01)
*C08K 7/02*    (2006.01)
*C08L 67/02*    (2006.01)
*C08L 1/02*    (2006.01)

(52) U.S. Cl.
CPC ................ *C08L 67/04* (2013.01); *C08K 7/02* (2013.01); *C08L 67/02* (2013.01); *C08L 1/02* (2013.01); *C08L 2201/06* (2013.01); *C08L 2205/02* (2013.01); *C08L 2205/16* (2013.01)

(58) Field of Classification Search
CPC ............ C08L 67/04; C08L 67/02; C08K 7/02
USPC ....................................................... 523/124
See application file for complete search history.

(56) References Cited

FOREIGN PATENT DOCUMENTS

| CN | 103265669 | * | 8/2013 |
| CN | 103992517 | * | 8/2014 |

* cited by examiner

*Primary Examiner* — Deve V Hall
(74) *Attorney, Agent, or Firm* — Wang Law Firm, Inc.

(57) ABSTRACT

Disclosed is a biodegradable composition, including: 5 to 90 percent by weight of polylactic acid (PLA), 5 to 80 percent by weight of plant fiber, and 5 to 70 percent by weight of maleic anhydride-grafted polybutylene succinate (PBS-g-MA), acrylic acid-grafted polybutylene succinate (PBS-g-AA), or silane coupling agent-grafted polybutylene succinate (PBS-g-Silane). The article manufactured therefrom is not only biodegradable but also has an enhanced heat deformation temperature, impact resistance and tensile strength. Further, by so limiting the proportion of each component, compatibility between the components may be increased and crystallization of polylactic acid may be facilitated.

6 Claims, 2 Drawing Sheets

BIODEGRADABLE COMPOSITION

BACKGROUND

Field of the Invention

The present invention relates to a composition, and more particularly to a biodegradable composition.

Related Prior Art

Due to the high environmental awareness and the shortage of raw materials for petrochemical products, plastic products made of biodegradable components, such as toys and tableware, have been developed to gradually replace traditional plastics. A common biodegradable composition is polylactic acid (PLA). When biodegradable plastic is discarded in the natural environment, the polylactic acid contained in it will be metabolized and decomposed by microorganisms in the environment. If the biodegradable plastic is directly incinerated, only water and carbon dioxide will be produced, so it will not cause an impact on the environment.

However, the current biodegradable plastic products still have technical bottlenecks, and cannot completely replace the existing plastic products made from petrochemical products. For example, when the biodegradable composition is applied into environmentally friendly tableware, due to its limited heat resistance, it will start to become softened and deformed once its temperature exceeds 60° C. In order to make PLA tableware more durable, many methods are to mix it with traditional plastics, so that it is not 100% decomposable anymore. In addition, once plasticizers and other additives are added to improve the heat resistance of PLA tableware, there is still a risk of plasticizer release when PLA tableware is exposed to heat. In addition, plastic products made of biodegradable compositions have obviously poor impact resistance, so that they cannot withstand long-distance transportation and long-term storage, and cannot provide adequate protection for the stored objects.

The present invention has arisen to mitigate and/or obviate the afore-described disadvantages.

SUMMARY

The technical problem to be solved by the present invention is to provide a biodegradable composition, the products made of it are not only biodegradable, but also capable of improving the thermal deformation temperature, impact resistance, and tensile strength.

Another technical problem to be solved by the present invention is to provide a biodegradable composition, which mainly improves the compatibility between the components and promotes the crystallization of polylactic acid.

Therefore, in order to solve the above problems, a biodegradable composition is provided according to the present invention, and includes: 5-90% by weight of polylactic acid (PLA); 5-80% by weight of plant fiber; and 5-70% by weight of maleic anhydride (MA)-grafted polybutylene succinate (PBS)(PBS-g-MA).

Preferably, the preferred ratio of components in the biodegradable composition is: 30-50% by weight of polylactic acid; 20-40% by weight of plant fiber; and 15-30% by weight of PBS-g-MA.

Accordingly, the present invention uses PBS-g-MA to form an interface compatible structure as a good chemical bridge of the organic/inorganic interface(s) between the three components, which can effectively improve the overall properties of the composite material to solve the longstanding problems of compatibility, processability and degradation between polylactic acid (PLA) and plant fiber, and also increase the heat distortion temperature, impact resistance, and tensile strength. In particular, the interface compatible structure, toughening structure and thermal stabilization mechanism formed by the PBS-g-MA are the best for improving the tensile strength.

Also in order to achieve the foregoing objective, the present invention additionally provides a biodegradable composition comprising: 5-90% by weight of polylactic acid (PLA); 5-80% by weight of plant fiber; and 5-70% by weight of poly acrylic acid (AA)-grafted polybutylene succinate (PBS-g-AA).

Preferably, the preferred ratio of components in the biodegradable composition is: 30-50% by weight of polylactic acid; 20-40% by weight of plant fiber; and 15-30% by weight of PBS-g-AA.

Accordingly, the present invention uses PBS-g-AA to form an interface compatible structure as a good chemical bridge of organic/inorganic interface(s) between the three components, which can effectively improve the overall properties of the composite material to solve the longstanding problems of compatibility, processability and deterioration between polylactic acid (PLA) and plant fiber. In particular, the interface compatible structure, toughening structure and thermal stabilization mechanism formed by PBS-g-AA are the best for improving impact resistance.

Also in order to achieve the foregoing objective, the present invention further provides a biodegradable composition comprising: 5-90% by weight of polylactic acid (PLA); 5-80% by weight of plant fiber; and 5-70% by weight of silane coupling agent-grafted polybutylene succinate (PBS-g-Silane).

Preferably, the preferred ratio of components in the biodegradable composition is: 30-50% by weight of polylactic acid; 20-40% by weight of plant fibers; and 15-30% by weight of PBS-g-Silane.

Accordingly, the present invention uses PBS-g-Silane to form an interface compatible structure as a good chemical bridge of organic/inorganic interface between the three components, which can effectively improve the overall properties of the composite material to solve the longstanding problems of compatibility, processability and degradation between polylactic acid (PLA) and plant fiber, and also increase the heat distortion temperature, impact resistance, and tensile strength. In particular, the interface compatible structure, toughening structure and thermal stabilization mechanism formed by PBS-g-Silane are the best for increasing the heat distortion temperature.

Preferably, the plant fiber is at least one selected from a group consisting of sugarcane fiber, bamboo fiber, coconut fiber, hemp fiber, palm husk fiber, coffee grounds, wine dregs, wheat meal, cotton, rice stalk, rice husk, corn stalk, starch, stalk, white bamboo shoots and wood flour.

DETAILED DESCRIPTION

The first embodiment of the present invention provides a biodegradable composition, which is suitable for making tableware, and of course it can also be applied into a toy, but is not limited to these examples. The composition is composed of polylactic acid (PLA), plant fiber, and a compatibilizer, among which:

The plant fiber in this embodiment is sugarcane fiber as an example, but is not limited to this example, and can be at least one selected from the following group including bamboo fiber, coconut fiber, hemp fiber, palm shell fiber, coffee residues, wine dregs, wheat dregs, cotton, rice stalks, corn stalks, starch, bamboo shoots and wood flour.

Figure 1:
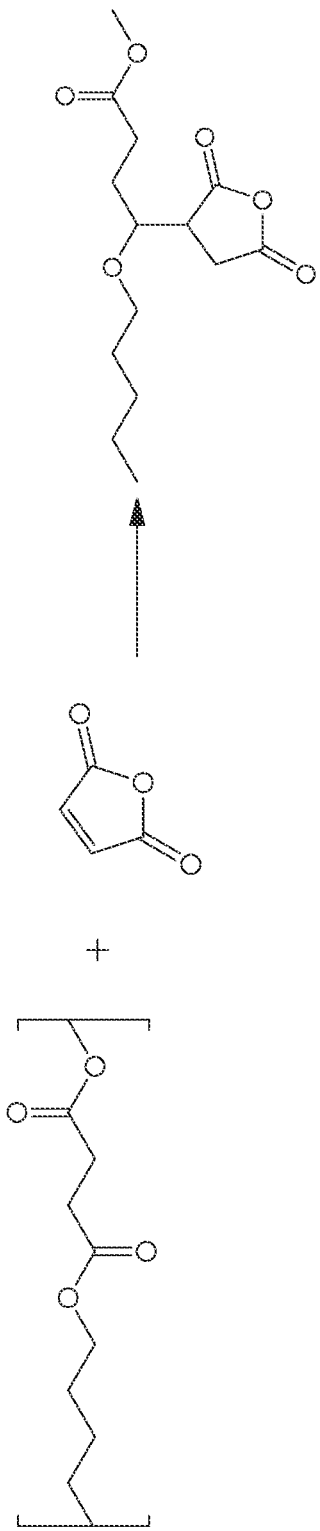
FIG. 1 shows the preparation of PBS-g-MA in the first embodiment of the present invention.

As shown in FIG. 1, the compatibilizer in this embodiment is PBS-g-MA as an example, but is not limited to this example, and can also be PBS-g-AA or PBS-g-Silane.

The main method for preparing the composition in this embodiment is that polylactic acid (PLA) being in granular form and having a weight percentage of 50 and PBS-g-MA being in granular form and having a weight percentage of 15 are mixed evenly in a twin-screw extruder, and then sugarcane fiber being in powder form and having a weight percentage of 35 is added to the twin-screw extruder to be evenly mixed with the mixture of PLA and PBS-g-MA to form biodegradable composition particles.

Subsequently, the biodegradable particles are dried at 90° C. for at least 1 hour, so that the average moisture content of the biodegradable particles is not more than 5000 ppm. Next, the biodegradable particles are subjected to an injection molding step at a processing temperature between 140° C. and 230° C. and a mold temperature between 80° C. and 120° C. to obtain a solid structure shape of a piece of tableware.

Accordingly, the PBS-g-MA added in the present invention, in addition to improving the heat distortion temperature, impact resistance, and tensile strength of the products made of the biodegradable composition, such as tableware or toys, can also improve the compatibility between the components and promote the crystallization of polylactic acid under the ratio of 50% by weight of polylactic acid (PLA), 15% by weight of sugar cane fiber, and 35% by weight of PBS-g-MA. Of course, the compatibility between the components can be further enhanced and the crystallization of polylactic acid can be further promoted under the ratio of 40% by weight of polylactic acid (PLA), 30% by weight of sugar cane fiber, and 30% by weight of PBS-g-MA.

The main reason why the tableware made by the present invention can increase the heat distortion temperature is: the ratio of 50% by weight of polylactic acid (PLA), 35% by weight of PBS-g-MA and 15% by weight of sugarcane fiber effectively enhances the crystallinity of the polymer and the three-dimensional support structure provided by the sugarcane fiber, thereby enhancing the tableware made of the present invention to be able to withstand the temperature above 60° C. without releasing hazardous substances. In addition, the ratio of 10% by weight of polylactic acid (PLA), 65% by weight of sugar cane fiber, and 25% by weight of PBS-g-MA can further enhance the crystallinity of the polymer and the three-dimensional support structure provided by the sugarcane fiber, and therefore, the tableware made by the present invention can withstand a temperature above 60° C. without releasing harmful substances.

The main reason why the tableware made by the present invention can improve the impact resistance is: the ratio of 50% by weight of polylactic acid (PLA), 35% by weight of PBS-g-MA and 15% by weight of sugarcane fiber obviously and effectively enhances the chemical bridge(s) of organic/inorganic interface(s) between the three interfaces, effectively enhances the overall properties of the composite material, thereby increasing the impact resistance of the tableware made of the present invention. In addition, under the ratio of 20% by weight of polylactic acid (PLA), 30% by weight of sugar cane fiber, and 50% by weight of PBS-g-MA, the chemical bridge(s) of organic/inorganic interface(s) between the three interfaces is significantly and effectively enhanced so that the overall properties of the composite material are effectively improved, thereby increase the impact resistance of the tableware made by the present invention.

The main reason why the tableware made by the present invention can increase the tensile strength is that the ratio of 50% by weight of polylactic acid (PLA), 35% by weight of PBS-g-MA and 15% by weight of sugarcane obviously and effectively enhances the good chemical bridge of organic/inorganic interface(s) between the three interfaces, effectively improves the overall properties of the composite material and greatly increases the crystallinity of PLA, thereby enhancing the tensile strength of the tableware made by the present invention. In addition, the ratio is 55% by weight of polylactic acid (PLA), 30% by weight of sugar cane fiber, and 15% by weight of PBS-g-MA, can further improve the good chemical bridge of organic/inorganic interface(s) between the three interfaces, effectively improves the overall properties of the composite material and greatly increases the crystallinity of PLA, thereby enhancing the tensile strength of the tableware made by the present invention.

The main reason why the composition of the present invention can improve the compatibility between the components and promote the crystallization of polylactic acid is: under the ratio of 50% by weight of polylactic acid (PLA), 15% by weight of PBS-g-MA and 35% by weight of sugarcane fiber, or the preferred ratio of 40% by weight of polylactic acid (PLA), 30% by weight of PBS-g-MA and 30% by weight of sugarcane fiber, the interface(s) between the three forms a good chemical bridge of organic/inorganic interface(s), which promotes the uniform distribution and bonding of fibers in the base, resulting in a copolymerization and blending situation, which makes the molecular chains arranged closer and have the larger attraction force therebetween to increase the crystallinity significantly. Besides, the compound organic nucleating agent and the polymer nucleating agent reduce the free energy of the molecular chain surface, so that PLA can start crystallize at a higher temperature during the cooling process; and the two nucleating agents strengthen the crystallization ability and increase the degree of re-crystallinity of the PLA, thereby enhancing the compatibility between the components of the composition of the present invention, and also promoting the crystallization of polylactic acid.

It is worth mentioning that: adding plant fiber to the composition of the present invention is to increase the strength of the polylactic acid base, and adding a small amount of plant fiber may not have good effects on heat deformation temperature, impact resistance, tensile strength, etc., but a large amount of plant fiber may cause fiber entanglement and aggregation, which will reduce the strength of mechanical properties. In addition, the addition of PBS-g-MA as a compatibilizer is to promote the compatibility of the polylactic acid and plant fiber, so that the properties of the composition will not decrease or will be enhanced. If the proportion of addition is too small, such an effect may not be obvious. If the addition is too much in proportion, the cost will relatively increase and the property increase may have reached the highest level. According to this, the components and their proportions of the present invention may reach the most suitable ratio of additions under the limit of the lowest cost for not only increasing the effects of heat distortion temperature, impact resistance, tensile strength, etc. but also enhancing the compatibility between the components as well as promoting the crystallization of polylactic acid.

The manufacturing methods of the second embodiment to the fourth embodiment are the same as the manufacturing method of the first embodiment. The difference between the first to fourth embodiments lies in the different component usage of the biodegradable compositions in the second embodiment to the fourth embodiment, and the component usage is shown in the below table 1.

TABLE 1

| | | First embodiment | Second embodiment | Third embodiment | Fourth embodiment |
|---|---|---|---|---|---|
| Composition components | Polylactic acid (PLA) | 50% | 10% | 20% | 55% |
| | Sugarcane fiber starch | 35% | 65% | 30% | 30% |
| | PBS-g-MA | 15% | 25% | 50% | 15% |
| Mechanical properties | Heat distortion temperature (° C.) | | 135 | 124 | 106 |
| | Impact resistance (kgf-cm/cm) | | 5.8 | 14.2 | 9.5 |
| | Tensile strength (Kg/cm2) | | 383 | 582 | 691 |

Evaluation method: the temperature resistance test of the biodegradable composition of the first embodiment to the fourth embodiment is based on the D-648 method of the American Society for Testing and Materials (ASTM). In short, this test method is conducted in accordance with ASTM D648, and the flexural elasticity at high temperature is measured under a pressure of 66 psi (0.455 Mpa). Generally speaking, the degree of thermal deformation of amorphous resins is affected by the glass transition temperature, while that of crystalline resin is affected by its melting point.

The impact resistance test of the biodegradable composition of the first embodiment to the fourth embodiment is based on the D-256 method of the American Society for Testing and Materials (ASTM). In short, the impact resistance test is to unilaterally fix a test piece with a notch to a pendulum impact tester. Then, using the cantilever beam, let the pendulum drop to hit the notch of the test piece. Then, calculate the energy consumed by the pendulum impact tester.

The tensile strength test of the biodegradable composition of the first embodiment to the fourth embodiment is based on the D-638 method of the American Society for Testing and Materials (ASTM). In short, the tensile strength test is conducted in accordance with ASTM D638. The dumbbell-shaped test piece with length 127 mm/width 25 mm/thickness 3.2 mm and the Instron Tester are used, and the tensile speed is 50 mm/min at room temperature.

Figure 2:
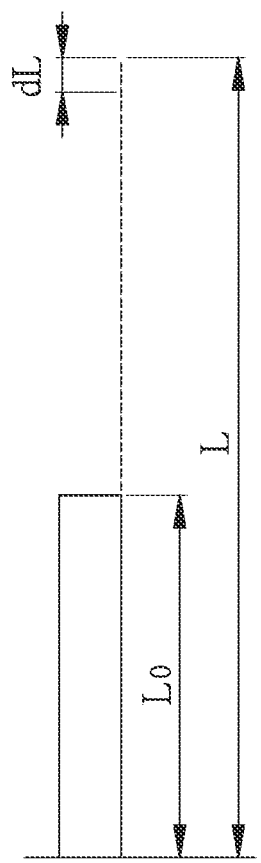
FIG. 2 is a schematic diagram of strain definition in the first embodiment of the present invention.
Figure 3:
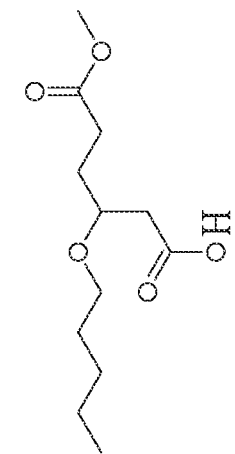
FIG. 3 shows the preparation of PBS-g-AA in the fifth embodiment of the present invention.
Figure 3:
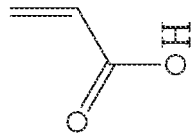
Figure 3:
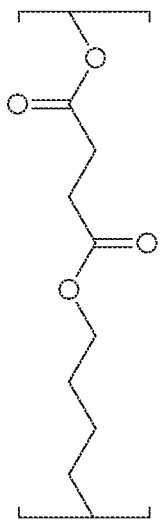

The actual strain definition is shown in FIG. 2:

$\varepsilon = \Delta L / L0$; where L0: the length of the calibrated distance at the origin (t=0); and L: the length of the calibrated distance at any time. The manufacturing methods of the fifth embodiment to the seventh embodiment are the same as the manufacturing method of the first embodiment, and the evaluation methods of the thermal deformation temperature, impact strength, and tensile strength of the fifth to seventh embodiments are the same as those of the first embodiment, so they will not be repeated here. The difference between the first and fifth to seventh embodiments lies in the different components of the biodegradable compositions and their amounts in the fifth to seventh embodiments. The amounts of components used are shown in Table 2 below. As shown in FIG. 3, the compatibilizer in this embodiment is PBS-g-AA as an example.

TABLE 2

| | | Fifth embodiment | Sixth embodiment | Seventh embodiment |
|---|---|---|---|---|
| Composition components | Polylactic acid (PLA) | 10% | 20% | 55% |
| | Sugarcane fiber starch | 65% | 30% | 30% |
| | PBS-g-AA | 25% | 50% | 15% |
| Mechanical properties | Heat distortion temperature (° C.) | 133 | 116 | 103 |
| | Impact resistance (kgf-cm/cm) | 6.1 | 14.7 | 10.2 |
| | Tensile strength | 366 | 562 | 626 |

Figure 4:
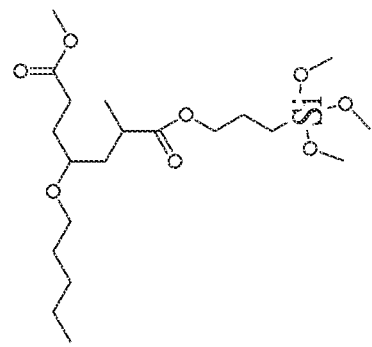
FIG. 4 shows the preparation of PBS-g-Silane in the eighth embodiment of the present invention.
Figure 4:
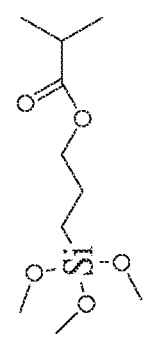
Figure 4:
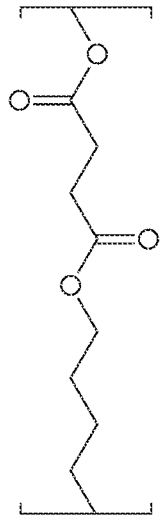

The manufacturing methods of the eighth embodiment, the ninth embodiment, and the tenth embodiment are the same as the manufacturing method of the first embodiment, and the evaluation methods of thermal deformation temperature, impact strength, and tensile strength in the eighth to tenth embodiments are the same as those of the first embodiment, so they will not be repeated here. The difference between the first and eighth to tenth embodiments lies in the different components of the biodegradable compositions and their amounts in the eighth to tenth embodiments. The amounts of components used are shown in Table 3 below. As shown in FIG. 4, the compatibilizer is PBS-g-Silane as an example.

TABLE 3

| | | eighth embodiment | ninth embodiment | tenth embodiment |
|---|---|---|---|---|
| Composition components | Polylactic acid (PLA) | 10% | 20% | 55% |
| | Sugarcane fiber starch | 65% | 30% | 30% |

TABLE 3-continued

|  |  | eighth embodiment | ninth embodiment | tenth embodiment |
|---|---|---|---|---|
|  | PBS-g-Silane | 25% | 50% | 15% |
| Mechanical properties | Heat distortion temperature (° C.) | 139 | 128 | 109 |
|  | Impact resistance (kgf-cm/cm) | 5.8 | 14.4 | 9.7 |
|  | Tensile strength | 355 | 548 | 604 |

In summary, the above-mentioned embodiments and drawings are only preferred embodiments of the present invention, and should not be used to limit the scope of implementation of the present invention, that is, all equal changes and modifications made in accordance with the scope of the present invention should fall within the scope of the present invention.

What is claimed is:

1. A biodegradable composition, comprising: 30-50% by weight of polylactic acid (PLA); 20-40% by weight of plant fiber; and 15-30% by weight of PBS-g-MA wherein the components are based on 100 wt % of the composition.

2. The biodegradable composition as claimed in claim 1, wherein the plant fiber is at least one selected from a group consisting of sugarcane fiber, bamboo fiber, coconut fiber, hemp fiber, palm husk fiber, coffee grounds, wine dregs, wheat dregs, cotton, rice stalk, rice husk, corn stalk, starch, white bamboo shoots and wood flour.

3. A biodegradable composition, comprising: 30-50% by weight of polylactic acid (PLA); 20-40% by weight of plant fiber; and 15-30% by weight of PBS-g-AA wherein the components are based on 100 wt % of the composition.

4. The biodegradable composition as claimed in claim 3, wherein the plant fiber is at least one selected from a group consisting of sugarcane fiber, bamboo fiber, coconut fiber, hemp fiber, palm husk fiber, coffee grounds, wine dregs, wheat dregs, cotton, rice stalk, rice husk, corn stalk, starch, white bamboo shoots and wood flour.

5. A biodegradable composition, comprising: 30-50% by weight of polylactic acid (PLA); 20-40% by weight of plant fiber; and 15-30% by weight of PBS-g-Silane wherein the components are based on 100 wt % of the composition.

6. The biodegradable composition as claimed in claim 5, wherein the plant fiber is at least one selected from a group consisting of sugarcane fiber, bamboo fiber, coconut fiber, hemp fiber, palm husk fiber, coffee grounds, wine dregs, wheat dregs, cotton, rice stalk, rice husk, corn stalk, starch, white bamboo shoots and wood flour.

* * * * *